United States Patent [19]

Freund

[11] 4,218,172

[45] Aug. 19, 1980

[54] METHOD OF AND ARRANGEMENT FOR CONTROLLING MANIPULATORS AND INDUSTRIAL ROBOTS

[75] Inventor: Eckhard Freund, Karlsruhe-Bergwald, Fed. Rep. of Germany

[73] Assignee: Fraunhofer-Gesellschaft zur Forderung der angewandten Forschung e.V., Munich, Fed. Rep. of Germany

[21] Appl. No.: 849,825

[22] Filed: Nov. 9, 1977

[30] Foreign Application Priority Data

Dec. 14, 1976 [DE] Fed. Rep. of Germany ....... 2656433

[51] Int. Cl.$^2$ .............................................. B25J 3/00
[52] U.S. Cl. .................................... 414/730; 364/513; 414/750; 414/909
[58] Field of Search ............ 214/1 CM; 318/574, 575; 364/478, 513, 118; 74/471 XY; 414/730, 750, 909

[56] References Cited

U.S. PATENT DOCUMENTS

| | | | |
|---|---|---|---|
| 3,909,600 | 9/1975 | Hohn | 364/513 |
| 3,951,271 | 4/1976 | Mette | 214/1 CM |

*Primary Examiner*—Reinhard J. Eisenzopf
*Attorney, Agent, or Firm*—John C. Smith, Jr.

[57] ABSTRACT

This disclosure is drawn to a method of and an arrangement for controlling the rotational and translatory motions of a manipulator or industrial robot, which automatically for the entire motion and speed range, even when there is simultaneous movement of a plurality of motion actuators, permit uniform, selectible and disturbance-independent dynamic control properties for individual or all motion parameters. The invention is characterized in that for each rotational or translational motion parameter of the manipulator or industrial robot to be controlled the positioning signal of the associated motion actuator is in part generated by a control means with selectible dynamics. This controller output signal is amplified multiplicatively by the output signal of an arrangement which for a rotational motion reproduces the associated variable moment of inertia and for a translatory motion the associated mass, respectively, inclusive of the variable load mass. The controller output signal is amplified to such an extent that thereby the effect of the variable moment of inertia or of the variable mass is compensated. The other part of the positioning signal of the associated motion actuator is supplied additively by the output of a further compensation arrangement which reproduces the dynamic intercouplings with the other motion variables so that the interference effect upon simultaneously varying a plurality of motion variables is eliminated.

4 Claims, 3 Drawing Figures

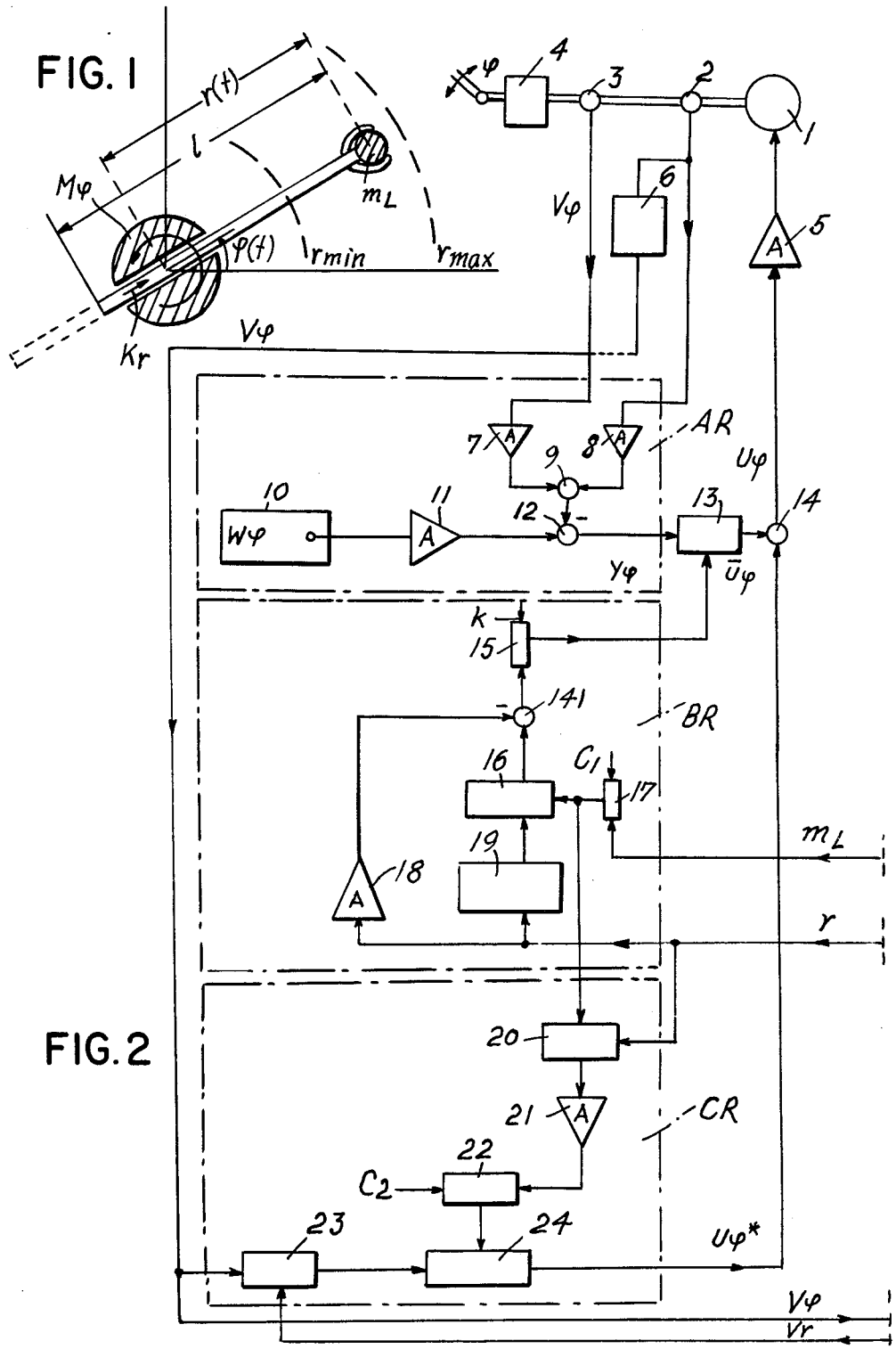

METHOD OF AND ARRANGEMENT FOR CONTROLLING MANIPULATORS AND INDUSTRIAL ROBOTS

BACKGROUND OF THE INVENTION

The invention relates to a method of and an arrangement for controlling the rotational and translatory motions of a manipulator or industrial robot, which automatically for the entire motion and speed range even in the event of a simultaneous movement of a plurality of motion actuators permit uniform, selectible and defect-independent dynamic control properties for individual or all motion variables.

For controlling motion variables (such as angle of rotation and extension lengths) of manipulators and industrial robots in relationship to predetermined values or predetermined trajectories, it is necessary that a substantial constancy of the dynamic control properties for all duty ranges and operational conditions be achieved without any readjustment of control parameters being necessary manually. A manual readjustment is not possible anyhow in practical use because of the rapidly changing work motions, and the same applies accordingly for the use of manipulators or robots in non-accessible areas such as for instance in nuclear engineering, in space engineering or in general areas of danger. The constancy of the dynamic control properties under various operational conditions is of great significance for the use of a manipulation system because, for instance, for assembly tasks an overswinging beyond the predetermined position may result in damage to the robot arm or in knocking down of the workpiece or tool to be gripped. A further example for the necessity of this requirement is that in the coordinated operation of two or more motion parameters of the roboter for following a predetermined trajectory the time behavior of the controlling of each individual motion variable must be identical, since otherwise track deviations occur which may result in an inaccurate work performance or in the arm colliding with an obstruction. Insuring constancy of the dynamic control properties is of particular significance for higher work speeds of the manipulator or industrial robot (equal to or greater than human motion speed) and for simultaneous higher standards of accuracy. Both objectives are strived for in the development of industrial robots and manipulators, in order to permit an economical use, for instance in the finishing technique. These objectives are also goal-leading for the use in manipulation tasks to be performed rapidly and precisely in non-accessible areas such as nuclear engineering and space engineering or in all types of areas of danger.

For the operation of manipulators and industrial robots, systems are known which receive the predetermined values of the motion variables in various types of stores (such as punched cards, magnetic tapes, etc.) and perform the motion course through the intermediary of a control. Prior art furthermore includes control methods for manipulators and industrial robots which are substantially identical with the control methods for machine tools, and use simple control loops with a PID behaviour for the preset-actual value control of the individual motion variables. A survey of the present state of the art of manipulators and industrial robots is presented in the "Erfahrungsaustausch Industrieroboter 1975", 5th Work Meeting, Institut für Produktionstechnik und Automatisierung (IPA) of the Fraunhofer Gesellschaft e.V. of the University of Stuttgart.

The conventional control arrangements for robot systems with PID controllers are insufficient for higher requirements to be provided regarding motion speed and accuracy. For work speeds in the range of human motion speed or higher speeds the dynamic intercouplings of each individual motion parameter to be controlled by the other motions of the manipulator or robot (for instance by centrifugal force or Coriolis-force) become so high that an error adjustment for the interferences by the PID controller is not possible within the period of time required for practical operations. These interference signals have been found to be a multiple of the actual control signal which would be generated without such dynamic intercouplings. Investigations with manipulators having more than three degrees of freedom have shown for higher standards of speed and accuracy that in these instances control with PID controllers is not possible any more for technically reasonable requirements for the reasons indicated. A further difficulty with a PID control is that the inertia moments to be accelerated have been found to vary up to a ratio of 1 to 10 during the course of movement. This for instance happens by retracting a rotating arm or by placing two arms behind each other by bending an arm. This means that the same positioning signal and thus positioning moment of the motor which is supplied from the control system acts upon a materially varying moment of inertia. This results in very different dynamics of the course of movement. The same applies accordingly in the correlated scope for a varied load of the gripper. Conventional control arrangements or manipulators and industrial robots therefore do not fulfill the mentioned requirements regarding work speed and simultaneous accuracy.

SUMMARY OF THE INVENTION

The object of the invention therefore is to achieve a uniform, selectible dynamic control behaviour for each individual motion variable (i.e. angle of rotation and extension lengths) of a robot or manipulator and to do so for the entire motion and speed range just as well as for load variations without a readjustment of the control parameters.

This object is attained according to the present invention in that for each motion parameter of a manipulator or industrial robot to be controlled (rotation and translation motion) the positioning signal of the associated motion actuator is in part generated by control means with selectible dynamics, this controllers output signal being amplified multiplicatively by the output signal of an arrangement which for a rotational motion reproduces the associated variable moment of inertia and for a translatory motion the associated mass, respectively inclusive of the variable load mass, this controller output signal being amplified to such an extent that thereby the effect of the variable moment of inertia or of the variable mass is compensated, and for the other part the positioning signal of the associated motion actuator is supplied additively by the output of a further compensation arrangement which reproduces the dynamic intercouplings with the other motion variables so that the interference effect upon simultaneously varying a plurality of motion variables is eliminated.

The actuators for the control method of this invention may be electrical, hydraulic or pneumatic devices which may have a rotary or translatory principle of operation by means of transmissions both for the translatory and for the rotary motion. Since by the compensation arrangements of the invention the remaining system to be controlled is a linear system of second order with constant coefficients for each motion variable, all control devices such as a control with condition resetting, PID controls or time-optimum controls known for this purpose may be used. The method of this invention may be limited to the control of a single motion variable and also be provided for the control of a plurality of motion variables or all motion variables for a manipulator or industrial robot which, according to the method of this invention, may be provided separately for each motion variable. A realization of the arrangement may be effected both with analog and digital means or by a mixing of both systems.

The advantages achieved by the invention in particular are that the dynamic, freely selectible control properties for each motion variable (i.e. angle of rotation and extension lengths) of the manipulator or industrial robot are uniform for all work motions so that rapid and at the same time precise courses of movement are possible. The dynamic control properties of each motion variable in contradistinction to conventional methods remain unaffected by the dynamic couplings as a result of the simultaneous movement of other motion variables (e.g. by Coriolis and centrifugal forces) as well as independent of variations of the moment of inertia and of the load. This constancy of the control properties holds true for the entire speed and motion range. In the practical use of the manipulator or industrial robot, there thus is the possibility of avoiding any overdriving of the predetermined values even for higher speeds with an aperiodical adjustment of the controller dynamics, without the speed ranges having to be switched over upon approximation. In a coordinated operation of two or more motion variables, predetermined tracks may be very precisely followed, since by the method of this invention the time constants for the dynamic overall behaviour of each motion variable may be precisely rendered equal and also maintain these values during the entire course of movement. The invention furthermore has the advantage, in contradistinction to conventional control systems, of permitting rapid movements even for redundant manipulators or industrial robot, i.e. for systems with more than three degrees of freedom of movement (e.g. for gripping around obstructions or for complicated assembly tasks without turning the workpiece). The rapid and precise control of these devices was found to not be possible with the conventional control methods.

BRIEF DESCRIPTION OF THE DRAWINGS

Two embodiments of the invention will now be described by way of example and with reference to the accompanying schematic drawings, in which:

FIG. 1 is a manipulator with a rotational movement and a translational movement;

FIG. 2 is an arrangement according to the invention for controlling the rotational movement of the manipulator of FIG. 1.

DESCRIPTION OF THE PREFERRED EMBODIMENTS

Figure 3:
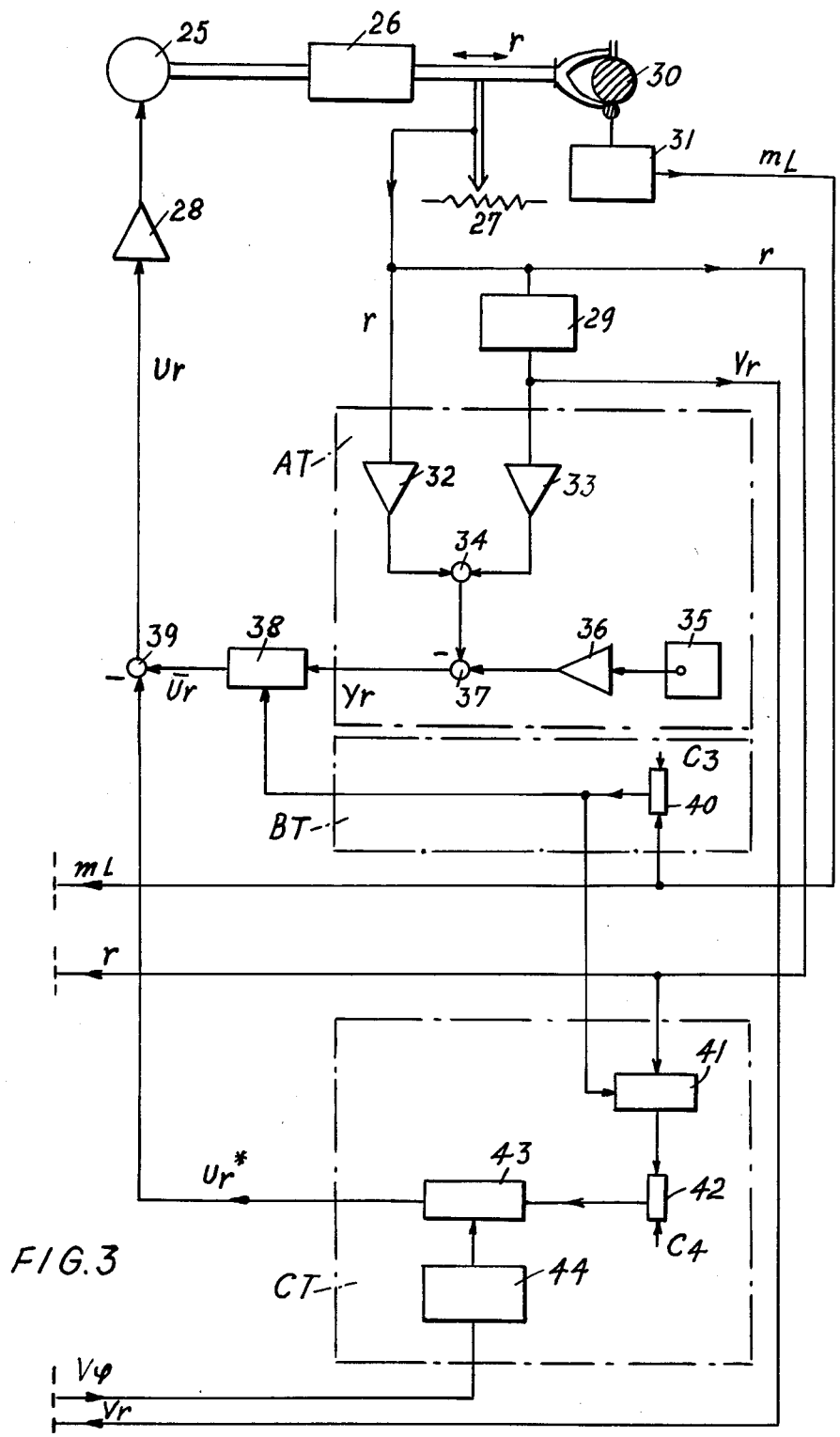
FIG. 3 is an arrangement according to the invention for controlling the translational movement of the manipulator of FIG. 1.

FIG. 1 shows a manipulator or industrial robot which is able to perform a rotational movement by the angle $\phi$ and a translational movement by the extension length r (between the minimum value $r_{min}$ and the maximum extension length $r_{max}$). A rotation by $\phi$ is performed by the movement $M_\phi$ provided by the first actuator, and an extension movement by the length r is caused by the force $K_r$ of the second actuator. The gripper of the manipulator arm carries a load having the mass $m_L$. The method of this invention is illustrated on the basis of a control of this rotational movement and the control of this translational movement as two separate embodiments.

FIG. 2 shows the arrangement for controlling the rotational movement for the manipulator of FIG. 1. An actuator 1, for instance provided as a disc-rotor motor, produces the required moment $m_\phi$ for the rotational movement by the angle of rotation $\phi$. A rotary primary 2 is attached to the actuator shaft for measuring the actual value of the angle of rotation $\phi$, adjacent thereto a tachogenerator 3 for measuring the angular velocity $V_\phi$. A transmission 4 reduces the rotational movement of the actuator 1 into the rotational movement by $\phi$. The actuator 1 is supplied by a positioning amplifier 5, the input of the positioning amplifier 5 being formed by the output of an adder 14. A differentiator 6 generates the time variations of the angle of rotation $\phi$ as a rotary velocity $V_\phi$ and may be used instead of the tachogenerator 3, in particular if the rotary movement of the actuator 1 is used directly, i.e. without the intermediary of a transmission 4, for the rotation of the manipulator arm about the angle $\phi$. In case of a digital realization of the differentiator 6 this may consist in the usual way of a circuit for the subtraction of two adjacent scanning values of $\phi$, of which one is shifted by one cycle, and the division by the scanning time. In case of an analog embodiment, this differentiator may for instance be realized by a conventional R-C member. For the comtemplated technical use, this simple realization is sufficiently precise. The control of this rotational movement of the manipulator of FIG. 1 is effected in accordance with the method of this invention by an arrangement AR, for the control dynamics, an arrangement BR for a compensation of the variable moment of inertia and an arrangement CR for a compensation of the dynamic couplings by the translational movement of the manipulator of FIG. 1. The arrangement AR just like the arrangement CR via the adder 14 supplies a direct positioning signal for the positioning amplifier 5. The controller output signal $y_\phi$ of the arrangement AR from a comparator 12 is amplified multiplicatively by the output signal of the arrangement BR.

In order to explain the structure of the arrangements AR, BR and CR, hereinafter first of all the physical description of the rotational movement is considered. The overall moment of inertia $\theta$ of the arm which has been illustrated diagrammatically in FIG. 1, is, m* in the usual way being the mass of the structure firmly connected to the arm (illustrated hatched), r* being the radius of this structure, l being the overall arm length of the arm, m being the mass of the rod-shaped arm (without structure), r(t) being the variable arm length (from the fulcrum to the gripper), and $m_L$ being the mass of the load:

$$\theta = \frac{m'r'^2}{2} + \frac{ml^2}{12} + m(r - \tfrac{l}{2})^2 + m_L r^2$$

With the abbreviation $$k = \frac{m'r'^2}{2} + \frac{ml^2}{3}$$

this equation has the form $$\theta = k - mlr + (m + m_L)r^2$$

The rotational movement by the angle $\phi$ is decisively determined by the Coriolis moment $M_c$, which is given by $$M_c = 2 \cdot V_\phi \cdot V_r \cdot m \cdot s$$

wherein $V_\phi$ is the rotary velocity, $V_r$ is the velocity in direction of translation, m is mass, and s is the distance from the mass center to the fulcrum. With $V_\phi$ as angular velocity and $V_r$ as extension velocity of the arm in FIG. 1, thus the overall Coriolis moment is, composed of the contribution for the center of gravity and that for the load:

$$m_c = 2V_\phi \cdot V_r \cdot m \cdot (r - \tfrac{l}{2}) + 2V_\phi \cdot V_r \cdot m_L \cdot r$$

Then in a known manner the moment equation is obtained, related to the fulcrum:

$$\theta = \dot{V}_\phi + M_c = M_\phi$$

Therein $\dot{V}_\phi$ is the angle acceleration $$\dot{V}_\phi = \frac{d}{dt} V_\phi$$

and $M_\phi$ is the moment to be produced by the actuator 1. Written in length, this is with $M_c$ in a combined form:

$$[k - mlr(t) + (m + m_L)r^2(t)] \cdot \dot{V}_\phi(t) = -[2(m + m_L)r(t) - ml]V_\phi(t)V_r(t) + M_\phi(t)$$

This model equation describes the rotational movement of the robot arm in FIG. 1, for this technical problem r, $V_\phi$, $V_r$, $\dot{V}_\phi$ and $M_\phi$ being parameters time varying by the various operational movements of the manipulator, which is expressed by the argument t. The load $m_L$ also varies, but only from one operation to the other. The assumption that some of these parameters temporarily are to be considered to be constant is in all cases impermissible for a practical use of a robot for higher requirements to be fulfilled by the system behaviour. From the model equation, the experience can be confirmed that for higher operation velocities of the robot, i.e. for higher $V_r$ and $V_\phi$, the intercoupling with the translational movement as a result of the Coriolis moment is in no way negligible. (For $V_r = 0$, i.e. with no translation, this coupling of course is not present.) It is perceivable from the model equation that the moment of inertia varies substantially depending on the extension length r and is also affected by a load variation, so that for fulfillment of accuracy requirements of the courses of movement these effects cannot be left unconsidered.

In employing the method of this invention, it is possible to specify arrangements for this embodiment in the form of the described rotational movement that the resultant overall behaviour of the rotational movement, i.e. from the preset value to the actual value of the rotational angle $\phi$, is able to be characterized by a linear differential equation of second order with any adjustable constant parameters. This differential equation is for the rotational movement $$\ddot{V}_\phi(t) + \alpha_{1\phi}\dot{V}_\phi(t) + \alpha_{\square\phi}\phi(t) = \lambda_\phi \omega_\phi(t)$$

Therein, the parameters $\alpha_{1\phi}$, $\alpha_{\square\phi}$, $\lambda_\phi$ are adjustable as desired, and $\omega_\phi(t)$ represent the preset values (tracks or individual positions) for the rotational angle $\phi$. As frequency effect definition, this equation with $\omega_\phi^*(s)$ and $\phi^*(s)$ as Laplace-transforms of $\omega_\phi(t)$ and $\phi(t)$ has the form $$\frac{\phi^x(s)}{\omega_\phi^x(s)} = \frac{\lambda_\phi}{s^2 + \alpha_{1\phi}s + \alpha_{\square\phi}}$$

This overall behaviour has for instance an aperiodical behaviour (i.e. maximum rise without overswinging) which is of decisive significance for manipulator motions when $\alpha_{1\phi}$ and $\alpha_{\square\phi}$ are adjusted such that the damping $$D = \tfrac{1}{2} \frac{\alpha_{1\phi}}{\sqrt{\alpha_{\square\phi}}} = 1$$

With $\lambda_\phi$, any desired input amplification from the preset value $\omega_\phi$ to the actual value $\phi$ may be adjusted for the stationary condition. According to the invention, for achieving this behaviour for the described rotational movement the three circuit arrangements AR, BR and CR in FIG. 2 are needed. Regarding the technical embodiment, it can be assumed that between the input signal $u_\phi$ at the positioning amplifier 5 in FIG. 2 and the moment $M_\phi$ of the actuator 1 provided at the shaft there is an approximate proportionality, i.e. $M_\phi \sim u_\phi$. Otherwise, this relationship is performable sufficiently precisely technically for the drive by compensation circuits. Since the proportionality factor is of no principle significance, $$M_\phi = u_\phi$$

can be considered to hold true.

The basic arrangement for the control of the rotational movement $\phi$, designated AR in FIG. 2, receives as input signals the rotational angle $\phi$ and the rotary velocity $V_\phi$ from the rotary primary 2 and the tachogenerator 3 or the differentiator 6, which latter may be used instead of the tachogenerator 3, as has been described hereinbefore. These signals are passed through amplifiers 7 and 8, respectively, which have an adjustable gain. This adjustable gain is $A_{1\phi}$ for the amplifier 7 and $a_{\square\phi}$ for the amplifier 8. The output signals of the amplifiers are passed through an adder 9 to the comparator 12. The second input signal of the comparator 12 is supplied by a preset value generator 10 with the preset values $\omega_\phi$ through an amplifier 11 which has an adjustable gain $\lambda_\phi$. The preset value generator 10 may be embodied as a preset value memory which has memorized all values of the angle $\phi$ of the manipulator or robot for the entire track, or may be fed in a time synchronization with the actual track movement for instance through a computer. The controller output signal as output of the comparator 12 is then passed through a multiplier 13 as positioning signal $\bar{u}_\phi$ to the adder 14 and to the input of the positioning amplifier 5 of the actuator 1. The circuiting of the positioning signal $\bar{u}_\phi$ alone, i.e. without the arrangements BR and CR, does not cause the strived for overall behaviour described hereinbefore yet, however, since the said interference affects have not been eliminated.

For this reason, in using the method of this invention, as a second step the arrangement BR is used which determines the gain of the positioning signal $\bar{u}_\phi$ from the arrangement AR via the multiplier 13. The arrangement BR serves to compensate the variable moment of inertia which has been defined in the model equation of the rotational movement given. Since the moment of inertia depends on the variable extension length r and the load mass $M_L$, these values are derived from the according measuring locations for the translational movement in FIG. 3. The measure value for $m_L$ is increased in an adder 17 by the constant value $c_1 = m$ and applied to a multiplier 16. The measured value for r is passed through an amplifier 18 having the gain factor m ·1 to a comparator 141. A functional generator 19 is connected in parallel thereto which defines the square of the input, and the multiplier 16. In an adder 15, the constant value k is added to the output of the comparator 141. The purpose of this arrangement is to reproduce the variation of the moment of inertia (defined in the model equation) and to compensate it through the positioning input $\bar{u}_\phi$ by means of the multiplier 13. This means that for instance a reduced moment of inertia as a result of a retracting of the arm and a load reduction has as a result a precisely correspondingly reduced positioning signal $u_\phi$ and thus motor moment $M_\phi$. Thereby, a continuously uniform effectiveness of the control means regarding the varying moment of inertia is achieved.

The purpose of the arrangement CR in FIG. 2 is to reproduce the dynamic couplings of other motion variables of the manipulator, in this instance of the Coriolis moment and to intrude it additively as an additional positioning signal. The output of the arrangement CR is the positioning signal $u_\phi^x$ which is provided for by means of the adder 14 in addition to the positioning amplifier 5. The arrangement CR in this embodiment reproduces the Coriolis moment at any period of time. Therefor, as measure magnitudes the load mass $m_L$ is needed which is increased by the constant value $c_1 = m$ and is taken over by the adder 17, and furthermore the extension length r of the translational motion (FIG. 3). Both signals are passed to a multiplier 20, are amplified in an amplifier 21 to the twofold value and are increased in an adder 22 by the constant value $c_2 = ml$. As further inputs, the arrangement needs the angular velocity $V_\phi$ measured in the tachogenerator 3 (or derived from the differentiator 6) as well as the extension velocity $V_r$ of the translational movement of FIG. 3, which are applied to a multiplier 23. The output of this multiplier 23 forms via a multiplier 24 which is connected to the adder 22 the additional positioning signal $u_\phi^x$. The intrusion of this positioning signal $u_\phi^x$ via the adder 14 to the positioning amplifier 5 means that the positioning magnitude $U_\phi$ and thus the motor moment $M_\phi$ is increased or decreased by the amount of the dynamic coupling, in this embodiment by the Coriolis moment, according to the respective sign of the coupling. This resulting in, for instance upon extending the arm and a simultaneous rotation, the decelerating effect of the Coriolis moment being compensated for at any period of time by a positioning magnitude $u_\phi$ increased by precisely this amount, so that the overall dynamics of the course of movement for the rotary angle $\phi$ are maintained, uneffected by the translational movement. This arrangement CR similarly results in, for a reduction of the rotational velocity caused by the preset value course $\omega_\phi$ and for a simultaneous extension of the arm, the decelerating effect of the Coriolis moment desired here being automatically utilized and the positioning magnitude $u_\phi$ at the positioning amplifier being reduced by precisely this amount so that the external physical moment is added to the moment provided by the actuator 1 and at any period of time precisely that moment is present which is desired for the control. In employing the method of this invention, thus by the arrangements AR, BR and CR the overall behavior provided for thereby is achieved with controller parameters $a_{\square\phi}$, $a_{1\phi}$ and $\lambda_\phi$ which is independent of variations of the moment of inertia and load as well as of the dynamic couplings by translational movement.

As a second embodiment, the controlling of the translatory motion for the manipulator of FIG. 1 is presented. This embodiment is correlated to the first embodiment by the structure of the manipulator, both controls are to be considered to be independent systems, however, when employing the method of this invention, the one controlling the motion magnitude $\phi$ and the other the motion magnitude r. It is therefore also possible to only control $\phi$ according to the specified method in the arrangement set forth with AR, BR and CR to provide a simple control loop only for the control of translation. For a precise track movement, however, this type of control would not be sufficient for the reasons set forth. In FIG. 3, the arrangement for controlling the translational movement for the manipulator of FIG. 1 according to the method of this invention is illustrated. An actuator 25 causes the translatory motion of the arm by the extension length r via a transmission 26, said extension length being measured via a potentiometer 27. The extension velocity $V_r$ is determined via a differentiator 29 which may also be devised in the fashion as described for the control of the translational movement. The gripper or hand of the manipulator arm grips around a load 30 which for manipulators and industrial robots in practical use generally changes for every operation, the dynamic behaviour thereby been affected. In order to take into account this affect, the load mass $m_L$ is measured by a measuring device 31. This measuring device 31 is for instance able to be embodied by a tactile sensor which determines the mass by the compression of a spring as a result of the weight of the load. It is decisive for the actuator (corresponding to the drive for the rotational movement) that the force $K_r$ which causes the translational motion is approximately proportional to the positioning signal $u_r$ at the positioning amplifier 28 of the drive, thus $u_r = K_r$. This is capable of being accomplished sufficiently precisely with available technical means, e.g. for embodiments of the drive as a disc rotor drive with a possible compensation circuit or as hydraulic piston in a direct realization of blocks 25 and 26.

In order to explain the arrangement for controlling these means, the physical definition of the translatory motion is considered which is to be determined in the known fashion by the force equation. The centrifugal force Z is of a decisive affect which is given by the angular velocity $\phi$ and s as the distance from the mass center to the fulcrum by $$Z = m \cdot s \cdot V_\phi^2$$

and which dynamically intercouples the translatory motion with the rotational motion. Related to the arm of FIG. 1, according to this equation a value for the centrifugal force related to the center of gravity and a further value related to the load is obtained, so that on the whole $$Z = m(r-\tfrac{1}{2})V_\phi^2 + m_L \cdot r\, V_\phi^2$$

In the range of human motion speed the centrifugal force assumes values which are not able to be neglected any more. With $K_r$ as the force which the positioning motor provides for the extension motion and $$\ddot{V}_r = \frac{dV_r}{dt}$$

as acceleration, the force equation is $$(m+m_L)\cdot \ddot{V}_r = Z + K_r$$

or upon inserting Z in a combined form:

$$(m+m_L)\ddot{V}(t) = [(m+m_L)\,r(t) - m\tfrac{1}{2}]V_\phi(t)^2 + K_r(t)$$

This model equation defines the translatory motion, the physical magnitudes dependent on the time t being provided with the argument t. The objective of the control is to provide three arrangements corresponding to the rotational motion in such a way that the overall behaviour of the motion magnitude r is $$\ddot{V}_r(t) + \alpha_{1r} V_r(t) + \alpha_{\Box r}\, r(t) = \lambda_r \omega_r(t)$$

wherein $\alpha_{\Box r}$, $\alpha_{1r}$ and $\lambda_r$ represent the parameters adjustable as desired and $\omega_r(t)$ represents the values for r(t).

In the arrangement AT of FIG. 3 (corresponding to AR for rotation), the basic arrangement for the control with these parameters has been realized. The extension length r measured in the potentiometer 27 is introduced to an amplifier 32 with the variable gain $\alpha_{\Box r}$. The extension velocity $V_r$, which is formed in the differentiator 29 represents the input signal of an amplifier 33 with the variable gain $\alpha_{1r}$. The output signals of both amplifiers are added in an adding circuit 34 and passed to a comparator 37. A preset value generator 35 (or preset value memory) feeds the preset values $\omega_r$ for r via an amplifier 36 having the adjustable gain $\lambda_r$ to the comparator 37. The controller output signal $y_r$ as the output of the comparator 37 is passed via a multiplier 38 to an adder 39 which feeds the positioning amplifier 28 of the actuator 25 for the translational motion. Thereby with the arrangement AT a self-contained control system of selectible dynamics is defined for controlling the extension length r in relationship to the preset value $\omega_r$, which, however, does not contain any compensation for the variation of the total mass by a load variation and any compensation of the dynamic coupling by the rotational motion through centrifugal force.

In employing the method of this invention, for the rotational motion the variable moment of inertia (in the first embodiment with the arrangement BR) and for the translatory motion the variable mass are compensated in using the same principle, which in this embodiment is done by the arrangement BT of FIG. 2. In the instant case, this arrangement is very simple and consists of an adder 40 which increases the measured value of the load mass $m_L$ by the constant value $C_3 = m$. The compensation of the varied load through the positioning signal $u_r$ is thereby effected by the multiplier 38 which amplifies the controller output signal $y_r$ from the comparator 37 in an according degree.

The compensation of the dynamic intercoupling of the translatory motion under consideration here with the rotational motion is effected by the arrangement CT (corresponding to the arrangement CR in the control system of rotational motion). In employing the method of this invention, the arrangement CT reproduces the dynamic intercoupling (in this case centrifugal force) and passes the additional positioning signal $u_r$ thereby resulting via the adder 39 to the positioning amplifier 28 of the actuator 25. The principle forming the basis thereof is identical with that procedure employed for rotational movement. For the circuitry reproduction of the couplings by the centrifugal force which has been defined in the model equation, the signal r is multiplied in a multiplier 41 by the output of the adder 40. The output of the multiplier is increased in an adder 42 by the constant value $c_4 = m \cdot \tfrac{1}{2}$. This signal is passed to a multiplier 43 the second input of which is supplied by a functional generator 44 which has a square characteristic. The output of the multiplier 43 is the positioning signal $u_r$ which serves to compensate the dynamic couplings. The connection of this arrangement CT to the arrangements AT and BT thus results in the desired interference independent overall behaviour with the parameters $\alpha_{1r}$, $\alpha_{\Box r}$ and $\lambda_r$ for controlling the translatory motion of the manipulator of FIG. 1.

The invention may be embodied in other specific forms without departing from the spirit or essential characteristics thereof. The embodiments are therefore to be considered in all respects as illustrative and not restrictive.

What is claimed is:

1. A system for controlling the rotational and translatory motions of a load using an industrial robot comprising:
   (a) an actuator;
   (b) shaft means for connecting said actuator to a load to be moved;
   (c) first means generating a signal representative of the actual rotational and translatory motions of said shaft;
   (d) second means for generating a signal representative of a predetermined sequence of rotational and translatory motions;
   (e) third means for comparing the output of said first and second means;
   (f) fourth means for generating a signal representative of variable moment of inertia and mass of said actuator and said load;
   (g) fifth means for combining the output of said third and fourth means; and
   (h) means for controlling said actuator in response to the output of said fifth means.

2. The system of claim 1 wherein said first means comprises:
   (a) a rotary primary and a tachogenerator coupled to said shaft means; and
   (b) an adder for combining the signal outputs of said rotary primary and said tachogenerator.

3. The system of any one of claim 1 and 2 wherein said fourth means comprises:
   (a) a device for measuring the load mass;
   (b) a device for measuring the extension velocity of said actuator; and
   (c) a device for measuring the angular velocity of said actuator.

4. A method of controlling the rotational and translatory motions of an actuator and associated load which comprises:
   (a) generating a first signal representative of the actual rotational and translatory motions of said shaft;
   (b) comparing said first signal with a second signal representative of a predetermined sequence of rotational and translatory motions and providing a third signal representative thereof;
   (c) measuring the variable moment of inertia and mass of said actuator and associated load and providing a fourth signal representative thereof;
   (d) combining said third and fourth signals to provide a fifth signal; and
   (e) controlling said actuator in response to said fifth signal.

* * * * *